United States Patent
Yu et al.

(10) Patent No.: US 11,308,575 B2
(45) Date of Patent: Apr. 19, 2022

(54) OMNIDIRECTIONAL IMAGE PROCESSING METHOD AND DEVICE

(71) Applicant: Zhejiang University, Hangzhou (CN)

(72) Inventors: Lu Yu, Hangzhou (CN); Xuchang Huangfu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 15 days.

(21) Appl. No.: 17/044,265

(22) PCT Filed: Mar. 28, 2019

(86) PCT No.: PCT/CN2019/080042
§ 371 (c)(1),
(2) Date: Sep. 30, 2020

(87) PCT Pub. No.: WO2019/192377
PCT Pub. Date: Oct. 10, 2019

(65) Prior Publication Data
US 2021/0073938 A1   Mar. 11, 2021

(30) Foreign Application Priority Data

Apr. 1, 2018 (CN) .......................... 201810280029.8

(51) Int. Cl.
*G06T 3/00* (2006.01)
*G06T 7/73* (2017.01)
*G06T 9/00* (2006.01)

(52) U.S. Cl.
CPC .............. *G06T 3/0062* (2013.01); *G06T 7/73* (2017.01); *G06T 9/001* (2013.01)

(58) Field of Classification Search
None
See application file for complete search history.

(56) References Cited

U.S. PATENT DOCUMENTS 10,620,441 B2 * 4/2020 Van Der Auwera ........................ H04N 17/004
10,643,301 B2 * 5/2020 Coban .................... G06T 3/0087
(Continued)

FOREIGN PATENT DOCUMENTS

| CN | 102298771 A | 12/2011 |
| CN | 106384367 A | 2/2017 |
| CN | 107018336 A | 8/2017 |

OTHER PUBLICATIONS

Search Report dated Jun. 28, 2019 issued in PCT Application No. PCT/CN2019/080042.

*Primary Examiner* — Anand P Bhatnagar
(74) *Attorney, Agent, or Firm* — Muncy, Geissler, Olds & Lowe, P.C.

(57) ABSTRACT

The present invention discloses an omnidirectional image processing method and device. Format information is extracted from a code stream, positions in a decoded omnidirectional image is mapped to positions on a sphere by using a special mapping relationship according to the format information, and the decoded omnidirectional image at least includes one region which meets the special mapping relationship. The present invention can enable the regions in the decoded omnidirectional image to be distributed more uniformly than the sphere, thereby improving representation efficiency, and reducing conversion distortion. While designing the omnidirectional image processing method, the present invention also designs the corresponding device.

9 Claims, 9 Drawing Sheets

(56) References Cited

U.S. PATENT DOCUMENTS

| | | | |
|---|---|---|---|
| 10,805,614 B2* | 10/2020 | D'Acunto | H04N 21/8586 |
| 10,839,480 B2* | 11/2020 | Van Der Auwera | H04N 19/597 |
| 10,887,621 B2* | 1/2021 | He | G06T 17/30 |
| 10,957,044 B2* | 3/2021 | Van Der Auwera | H04N 19/597 |
| 2017/0336705 A1* | 11/2017 | Zhou | G06T 3/0062 |
| 2017/0339391 A1* | 11/2017 | Zhou | H04L 65/607 |
| 2018/0199065 A1* | 7/2018 | Adams | H04N 19/61 |
| 2019/0200023 A1* | 6/2019 | Hanhart | H04N 19/184 |
| 2019/0238861 A1* | 8/2019 | D'Acunto | H04N 19/23 |

* cited by examiner

| | |
|---|---|
| Lower | Left |
| Rear | Front |
| Upper | Right |

OMNIDIRECTIONAL IMAGE PROCESSING METHOD AND DEVICE

TECHNICAL FIELD

The present invention relates to the technical field of omnidirectional image processing, and more particularly relates to an omnidirectional image processing method and device.

BACKGROUND ART

A 360° omnidirectional image refers to all the scenes around an observation point in space which are composed of all the light that can be received by this observation point, and a sphere can describe all the scenes around the observation point. Since spherical images are difficult to store, and an existing image codec is designed for common non-omnidirectional images and is not ideal for the coding effect of the spherical images, it is necessary to convert the spherical images into omnidirectional image formats through projection, and the common projection formats include Equirectangular Projection (ERP), Cubemap Projection (CMP), etc. For omnidirectional images in different formats, an existing coding mode for common non-omnidirectional images such as HEVC, AVS2, AV1, etc. may be adopted for coding, and a locally adjusted coding method may also be adopted for different formats.

ERP sampling is shown in FIG. 1, and points on a sphere may be expressed with longitude $\varphi$ and latitude $\theta$. The sphere is mapped to a rectangle with an aspect ratio of 2:1 in a $\varphi$-$\theta$ coordinate system, and then the rectangle is uniformly sampled. The ERP format has oversampling and image texture overstretching issues in the high-latitude areas.

As shown in FIG. 2, a sphere is projected to six faces of a cube through a perspective projection, and then the cube is uniformly sampled. Compared with the ERP, the CMP samples the sphere more uniformly, and has higher coding efficiency. However, due to the characteristics of the perspective projection, the corners of each face of the cube have a higher sampling density than the central region. Correspondingly, for the sphere, the sampling uniformity of the sphere is insufficient.

After determining a position mapping relationship between the sphere and the omnidirectional image, the omnidirectional image may be sampled, so as to generate a pixel value for each pixel position, and then the omnidirectional image is coded and decoded. The position mapping relationship between the sphere and the omnidirectional image may also be utilized to perform format conversion of the omnidirectional image, and the ERP format may be converted to the CMP format or other formats.

SUMMARY OF THE INVENTION

In view of the defects in the prior art, the present invention provides a novel omnidirectional image processing method and device.

For the same area, in a Cubemap Projection (CMP) format, the central region of each face corresponds to a larger region on a sphere than marginal regions, which leads to non-uniform sampling on the sphere and redundant information in the marginal regions of the cube, and reduces the representation efficiency.

A main idea of the present invention is to enable the arc length of the unit interval at each latitude in an omnidirectional image to be as equal as possible on the sphere by adjusting a stretching relationship between the omnidirectional image and the sphere in different positions, thereby reducing information redundancy in the marginal regions in Cubemap projection, and improving the representation efficiency.

For this purpose, the present invention adopts the following technical solution:

A first objective of the present invention is to provide an omnidirectional image processing method, including:

decoding a code stream to obtain omnidirectional image coding format information; and determining a mapping relationship between a position (x, y) in at least one region in an omnidirectional image obtained by decoding the code stream and a position ($\theta$, $\varphi$) on a sphere according to the format information, wherein the mapping relationship is:

x and $\varphi$ are in linear relationship, and y and $$\frac{\theta}{\tan^{-1}\cos\varphi}$$

are in linear relationship, where x represents a first dimensional coordinate position of the region in the decoded omnidirectional image, y represents a second dimensional coordinate position of the region in the decoded omnidirectional image, $\varphi$ represents a longitude position of the sphere, $\theta$ represents a latitude position of the sphere, a line mapped to the sphere by a first dimensional coordinate axis is an equator line, and a line mapped to the sphere by a second dimensional coordinate axis is a prime meridian.

Preferably, the omnidirectional image format information is one of the following:

1) The format information is a format number, and the format number specifies a direction of a first dimensional coordinate of the region in the decoded omnidirectional image by default.

2) The format information includes a format number and direction information of the first dimensional coordinate of the region in the decoded omnidirectional image.

A second objective of the present invention is to provide an omnidirectional image processing method, including the following steps:

expressing at least one image region in an omnidirectional image by the following mapping relationship, wherein the mapping relationship between a position (x, y) in the image region and a position ($\theta$, $\varphi$) on a sphere is:

x and $\varphi$ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, $\varphi$ represents a longitude position of the sphere, $\theta$ represents a latitude position of the sphere, a line mapped to the sphere by a first dimensional coordinate axis is an equator line, and a line mapped to the sphere by a second dimensional coordinate axis is a prime meridian;

coding and writing the omnidirectional image expressed by the mapping relationship to a code stream; and writing format information of the mapping relationship to the code stream.

Preferably, the omnidirectional image format information is one of the following:

1) The format information is a format number, and the format number specifies a direction of a first dimensional coordinate of the region in the omnidirectional image by default.

2) The format information includes a format number and direction information of the first dimensional coordinate of the region in the omnidirectional image.

A third objective of the present invention is to provide an omnidirectional image processing method, including the following steps:

decoding a code stream to obtain omnidirectional image coding format information; and determining mapping relationships between a position (x1, y1) in a region 1 and a position (x2, y2) in a region 2 and their respective corresponding positions (θ1, φ1) and (θ2, φ2) on a sphere according to the format information since at least one pair of adjacent regions, i.e. the region 1 and the region 2, is present in a decoded omnidirectional image, wherein the mapping relationships are:

x1 and φ1 are in linear relationship, and y1 and $$\frac{\theta 1}{\tan^{-1}\cos\varphi 1}$$

are in linear relationship;

x2 and φ2 are in linear relationship, and y2 and $$\frac{\theta 2}{\tan^{-1}\cos\varphi 2}$$

are in linear relationship, where x1 represents a first dimensional coordinate position of the region 1 in the omnidirectional image, y1 represents a second dimensional coordinate position of the image region 1, φ1 represents a longitude position of the sphere corresponding to the position (x1, y1) in the region 1 in the omnidirectional image, and θ1 represents a latitude position of the sphere corresponding to the position (x1, y1) in the region 1 in the omnidirectional image; x2 represents a first dimensional coordinate position of the region 2 in the omnidirectional image, y2 represents a second dimensional coordinate position of the region 2 in the omnidirectional image, φ2 represents a longitude position of the sphere corresponding to the position (x2, y2) in the image region 2, and θ2 represents a latitude position of the sphere corresponding to the position (x2, y2) in the region 2 in the omnidirectional image; and a line mapped to the sphere by a first dimensional coordinate axis of the region 1 is the same as a line mapped to the sphere by a first dimensional coordinate axis of the region 2, and is an equator line of the sphere.

A fourth objective of the present invention is to provide an omnidirectional image processing device, including the following modules:

a format information extraction module, wherein input of the format information extraction module is a coding code stream, output of the format information extraction module is omnidirectional image format information, and the module decodes the coding code stream to obtain the omnidirectional image format information; and a position mapping module, wherein input of the position mapping module is the omnidirectional image format information, output of the position mapping module is a mapping relationship between a position (x, y) in at least one region in an omnidirectional image obtained by decoding the code stream and a position (θ, φ) on a sphere, and the mapping relationship is:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

Preferably, the omnidirectional image format information is one of the following:

1) The format information is a format number, and the format number specifies a direction of a first dimensional coordinate of the region in the omnidirectional image by default.

2) The format information includes a format number and direction information of the first dimensional coordinate of the region in the omnidirectional image.

A fifth objective of the present invention is to provide an omnidirectional image processing device, including the following modules:

a position mapping module, wherein output of the position mapping module is omnidirectional image format information, and a mapping relationship between a position (x, y) in at least one region in an omnidirectional image and a position (θ, φ) on a sphere is determined in the module as:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian; and a format information and image coding module, wherein input of the format information and image coding module is the omnidirectional image format information and the omnidirectional image expressed by the mapping relationship determined by the format information, output of the format information and image coding module is a code stream including the omnidirectional image and the format information of the omnidirectional image, and the module codes and writes the omnidirectional image and the format information to the code stream.

Preferably, the omnidirectional image format information is one of the following:

1) The format information is a format number, and the format number specifies a direction of a first dimensional coordinate of the region in the omnidirectional image by default.

2) The format information includes a format number and direction information of the first dimensional coordinate of the region in the omnidirectional image.

Compared with the prior art, by designing the special position mapping relationship between the sphere and the omnidirectional image, the present invention enables the arc length of the unit interval at each latitude in the omnidirectional image to be as equal as possible on the sphere, and the omnidirectional image to be distributed more uniformly on the sphere, so that the spherical uniformity of expression is improved, the sampling loss is reduced under the same sample number, and the coding efficiency is improved.

BRIEF DESCRIPTION OF THE DRAWINGS

In combination with the accompanying drawings, the principle of the present invention can be explained from embodiments given below.

The accompanying drawings illustrated here are to provide further understanding of the present invention and constitute a part of this application. Various embodiments of the present invention are merely to explain the present invention and are only some particular cases, and the application range of the present invention is not limited to these embodiments. In the drawings.

DETAILED DESCRIPTION OF THE INVENTION

Embodiment 1

The embodiment of the present invention provides an omnidirectional image processing method.

The omnidirectional image processing method provided by the present embodiment includes the following steps:

A code stream is decoded to obtain omnidirectional image coding format information. A mapping relationship between a position (x, y) in at least one region in an omnidirectional image obtained by decoding the code stream and a position (θ, φ) on a sphere is determined according to the format information. The mapping relationship is: x and φ are in linear relationship, and y and $$\frac{\theta}{\tan^{-1}\cos\varphi}$$

are in linear relationship.

x represents a first dimensional coordinate position of the region in the decoded omnidirectional image, y represents a second dimensional coordinate position of the region in the decoded omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

Figure 1:
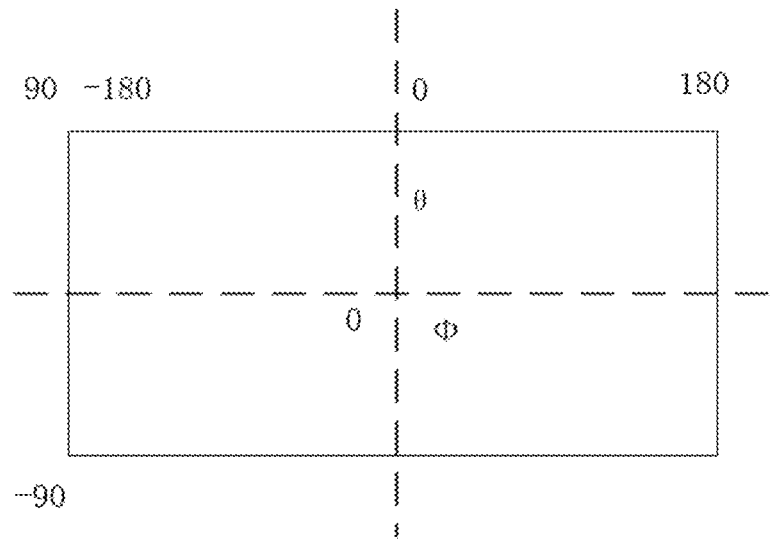
FIG. 1 is an Equirectangular Projection (ERP) format.
Figure 2:
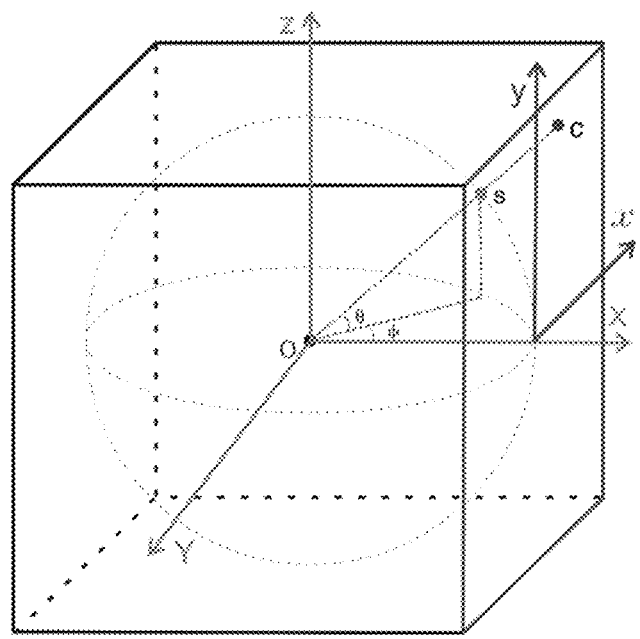
FIG. 2 is a schematic diagram of a mapping relationship of projecting a position on a sphere to a cube.
Figure 3:
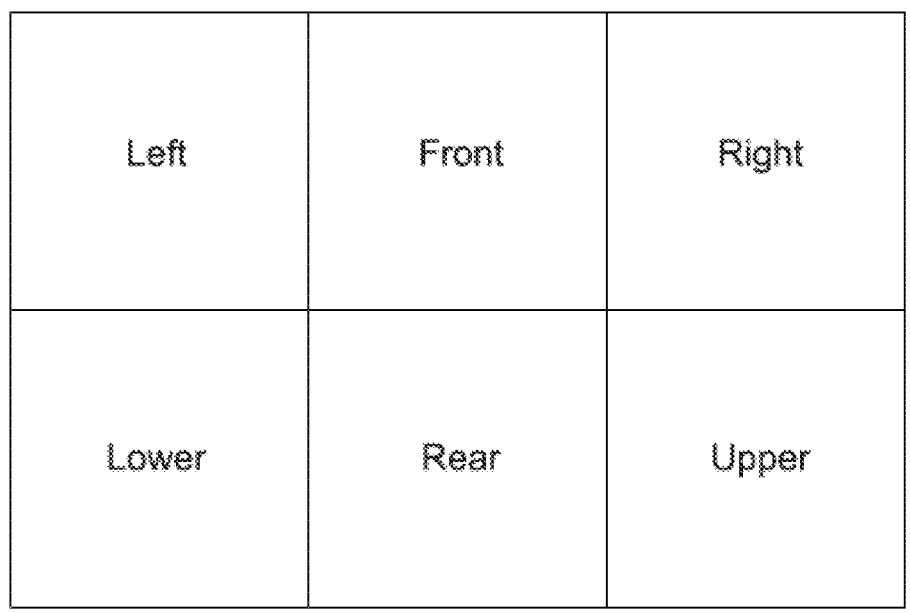
FIG. 3 is position relationships on an unfolded face of a cube in an embodiment of the present invention.

In the present embodiment, the decoded omnidirectional image is in a Cubemap Projection (CMP) format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

Figure 4:
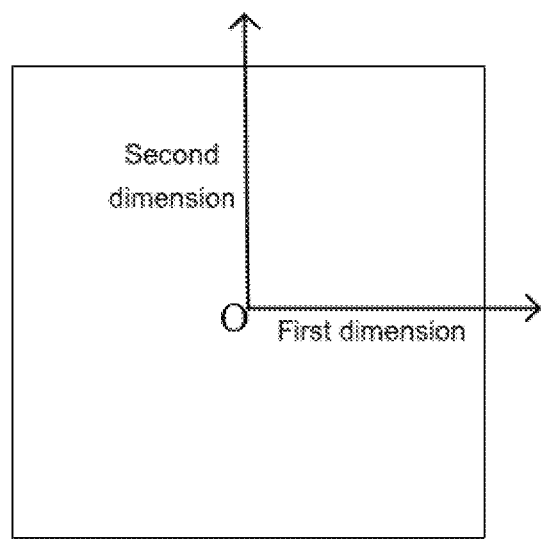
FIG. 4 is a coordinate system on a face of a cube in an embodiment of the present invention.

In this embodiment, the format information is a format number, and this format number specifies by default that a direction of a first dimensional coordinate of the region in the omnidirectional image is a horizontal direction, as shown in FIG. 4.

Embodiment 2

The embodiment of the present invention provides an omnidirectional image processing method.

The omnidirectional image processing method provided by the present embodiment includes the following steps:

A code stream is decoded to obtain omnidirectional image coding format information. A mapping relationship between a position (x, y) in at least one region in an omnidirectional image obtained by decoding the code stream and a position (θ, φ) on a sphere is determined according to the format information. The mapping relationship is:

x and φ are in linear relationship, and y and $$\frac{\theta}{\tan^{-1}\cos\varphi}$$

are in linear relationship.

x represents a first dimensional coordinate position of the region in the decoded omnidirectional image, y represents a second dimensional coordinate position of the region in the decoded omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the decoded omnidirectional image is in a CMP format, the region is a front face of the cube in FIG. 3, and the mapping relationship between (x, y) and (θ, p) is:

$$x = \frac{4}{\pi} \times \varphi, \text{ and}$$

$$y = \frac{\theta}{\tan^{-1}\cos\varphi}.$$

Figure 5:
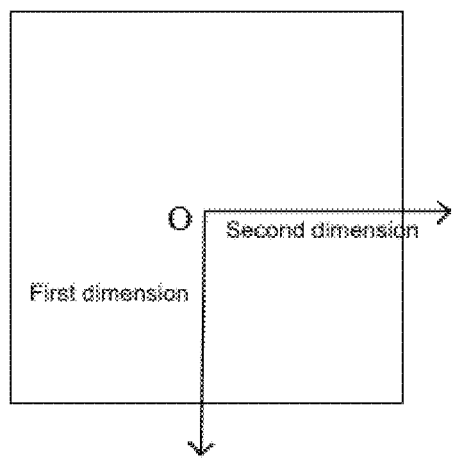
FIG. 5 is a coordinate system on a face of a cube in an embodiment of the present invention.

In this embodiment, the format information includes a format number and direction information of a first dimensional coordinate of the region, and this direction information specifies that a direction of the first dimensional coordinate of the region in the omnidirectional image is a vertical direction, as shown in FIG. 5.

Embodiment 3

The embodiment of the present invention provides an omnidirectional image processing method.

The omnidirectional image processing method provided by the present embodiment includes the following steps:

At least one image region in an omnidirectional image is expressed by the following mapping relationship. The mapping relationship between a position (x, y) in the image region and a position (θ, φ) on a sphere is:

x and φ are in linear relationship, and y and $$\frac{\theta}{\tan^{-1}\cos\varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, format information is a format number, and this format number specifies by default that a direction of a first dimensional coordinate of the region in the omnidirectional image is a horizontal direction, as shown in FIG. 4.

The omnidirectional image expressed by the mapping relationship is coded and written to a code stream.

The format information of the mapping relationship is also written to the code stream.

The sequence of writing the omnidirectional image and the format information to the code stream may be arbitrary. That is, the omnidirectional image may be coded and written to the code stream first, and then the format information of the mapping relationship is also written to the code stream. Or, the format information of the mapping relationship may be written to the code stream first, and then the omnidirectional image expressed by the mapping relationship is coded and written to the code stream.

Embodiment 4

The embodiment of the present invention provides an omnidirectional image processing method.

The omnidirectional image processing method provided by the present embodiment includes the following steps:

At least one image region in an omnidirectional image is expressed by the following mapping relationship. The mapping relationship between a position (x, y) in the image region and a position (θ, φ) on a sphere is:

x and φ are in linear relationship, and y and $$\frac{\theta}{\tan^{-1}\cos\varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the omnidirectional image is in a CMP format, the region in the omnidirectional image is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1} \cos \varphi}.$$

In this embodiment, format information includes a format number and direction information of a first dimensional coordinate of the region, and this direction information specifies that a direction of the first dimensional coordinate of the region in the omnidirectional image is a vertical direction, as shown in FIG. 5.

The omnidirectional image expressed by the mapping relationship is coded and written to a code stream.

The format information of the mapping relationship is also written to the code stream.

Embodiment 5

The embodiment of the present invention provides a method of sampling by using a mapping relationship.

The sampling method provided by the present embodiment includes the following steps:

At least one image region is included in a to-be-generated omnidirectional image. The mapping relationship between a position (x, y) in the image region and a position (θ, φ) on a sphere is.

x and φ are in linear relationship, and y and $$\frac{\theta}{\tan^{-1} \cos \varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the to-be-generated omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1} \cos \varphi}.$$

Figure 6:
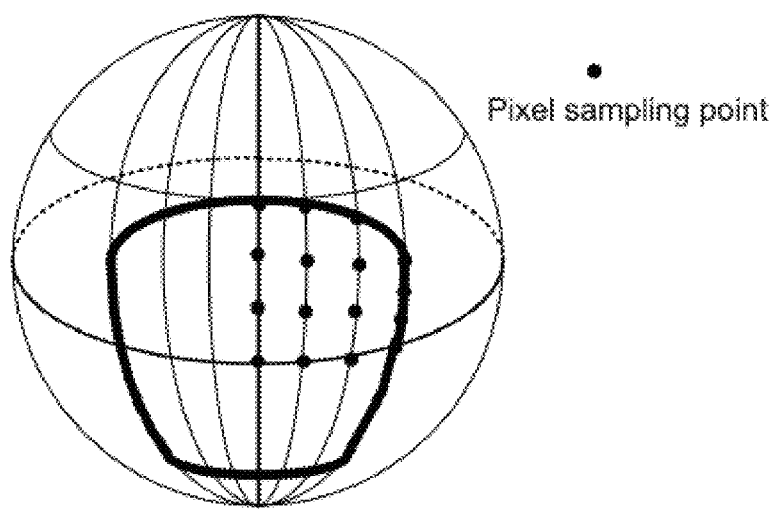
FIG. 6 is an effective region corresponding to a face of a cube on a sphere in an embodiment of the present invention.
Figure 7:
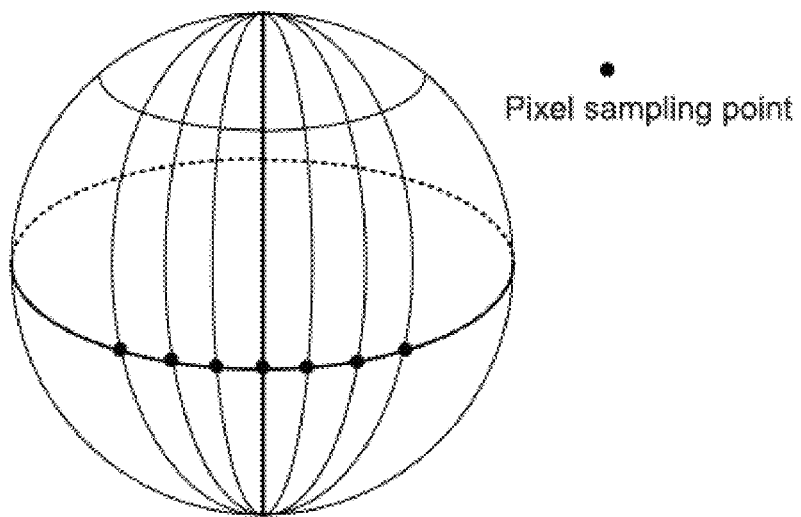
FIG. 7 is a schematic diagram of sampling with equal arc length in a horizontal direction on the equator.

Pixel sampling positions in a vertical direction are shown in FIG. 6, each meridian is sampled with equal arc length, but the arc lengths between adjacent sampling points on different meridians are different. Pixel sampling positions in a horizontal direction are shown in FIG. 7, the equator is sampled with equal arc length, and other positions are sampled with approximately equal arc length.

During sampling, first, the equator is sampled with equal arc length in the horizontal direction, and then meridians corresponding to all the horizontal sampling positions are sampled with equal arc length in the vertical direction.

According to the pixel sampling positions in the to-be-generated omnidirectional image, each pixel point in the to-be-generated omnidirectional image is interpolated on the sphere to obtain its corresponding pixel value.

Figure 8:
FIG. 8 is an unfolded image of a cube generated by using a processing method of this patent in an embodiment of the present invention.

FIG. 8 shows an image generated according to the position mapping relationship.

Embodiment 6

The embodiment of the present invention provides an omnidirectional image processing method.

The omnidirectional image processing method provided by the present embodiment includes the following steps:

A code stream is decoded to obtain omnidirectional image coding format information.

Mapping relationships between a position (x1, y1) in a region 1 and a position (x2, y2) in a region 2 and their respective corresponding positions (θ1, φ1) and (θ2, φ2) on a sphere are determined according to the format information since at least one pair of adjacent regions, i.e. the region 1 and the region 2, is present in a decoded omnidirectional image. The mapping relationships are:

x1 and φ1 are in linear relationship, and y1 and $$\frac{\theta 1}{\tan^{-1} \cos \varphi 1}$$

are in linear relationship;

x2 and φ2 are in linear relationship, and y2 and $$\frac{\theta 2}{\tan^{-1} \cos \varphi 2}$$

are in linear relationship.

x1 represents a first dimensional coordinate position of the region 1 in the omnidirectional image, y1 represents a second dimensional coordinate position of the image region 1, φ1 represents a longitude position of the sphere corresponding to the position (x1, y1) in the region 1 in the omnidirectional image, and θ1 represents a latitude position of the sphere corresponding to the position (x1, y1) in the region 1 in the omnidirectional image; x2 represents a first dimensional coordinate position of the region 2 in the omnidirectional image, y2 represents a second dimensional coordinate position of the region 2 in the omnidirectional image, φ2 represents a longitude position of the sphere corresponding to the position (x2, y2) in the image region 2, and θ2 represents a latitude position of the sphere corresponding to the position (x2, y2) in the region 2 in the omnidirectional image; and a line mapped to the sphere by a first dimensional coordinate axis of the region 1 is the same as a line mapped to the sphere by a first dimensional coordinate axis of the region 2, and is an equator line of the sphere.

In this embodiment, a front face and a right face in FIG. 3 are taken as the adjacent regions in the omnidirectional image, the front face is the region 1, and the right face is the region 2. The relationship between (x1, y1) and (φ1, θ1) is:

$$x1 = \frac{4}{\pi} \times \varphi1, \text{ and}$$

$$y1 = \frac{\theta1}{\tan^{-1}\cos\varphi1}.$$

The relationship between (x2, y2) and (φ2, θ2) is:

$$x2 = \frac{4}{\pi} \times \varphi2, \text{ and}$$

$$y2 = \frac{\theta2}{\tan^{-1}\cos\varphi2}.$$

Figures 9, 10:
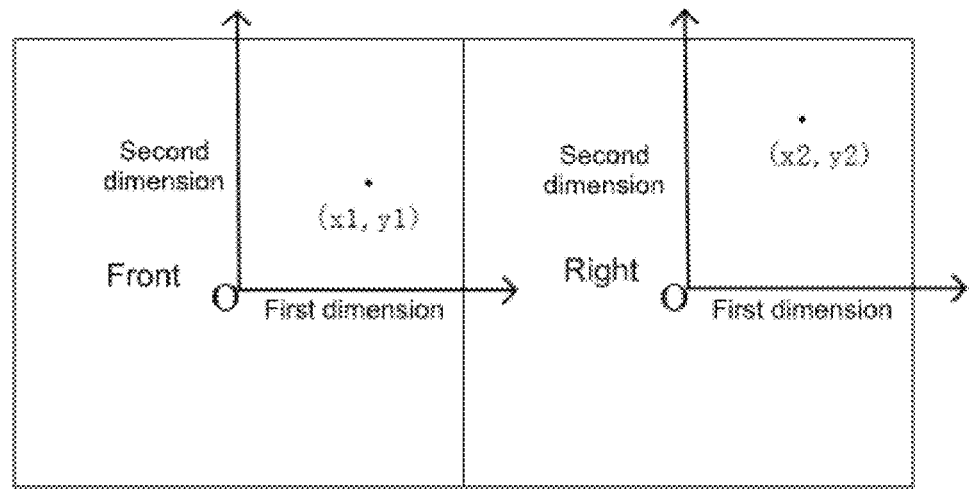
FIG. 9 is a schematic diagram of two adjacent regions arranged horizontally in an embodiment of the present invention.
FIG. 10 is a schematic diagram of arrangement of six faces on an unfolded face of a cube in an embodiment of the present invention.

In this embodiment, first dimensional directions of the region 1 and the region 2 are both horizontal directions, as shown in FIG. 9.

Embodiment 7

The embodiment of the present invention provides an omnidirectional image processing method.

The omnidirectional image processing method provided by the present embodiment includes the following steps:

A code stream is decoded to obtain omnidirectional image coding format information.

Mapping relationships between a position (x1, y1) in a region 1 and a position (x2, y2) in a region 2 and their respective corresponding positions (θ1, φ1) and (θ2, φ2) on a sphere are determined according to the format information since at least one pair of adjacent regions, i.e. the region 1 and the region 2, is present in a decoded omnidirectional image. The mapping relationships are:

x1 and φ1 are in linear relationship, and y1 and $$\frac{\theta1}{\tan^{-1}\cos\varphi1}$$

are in linear relationship;

x2 and φ2 are in linear relationship, and y2 and $$\frac{\theta2}{\tan^{-1}\cos\varphi2}$$

are in linear relationship.

x1 represents a first dimensional coordinate position of the region 1 in the omnidirectional image, y1 represents a second dimensional coordinate position of the image region 1, φ1 represents a longitude position of the sphere corresponding to the position (x1, y1) in the region 1 in the omnidirectional image, and θ1 represents a latitude position of the sphere corresponding to the position (x1, y1) in the region 1 in the omnidirectional image; x2 represents a first dimensional coordinate position of the region 2 in the omnidirectional image, y2 represents a second dimensional coordinate position of the region 2 in the omnidirectional image, φ2 represents a longitude position of the sphere corresponding to the position (x2, y2) in the image region 2, and θ2 represents a latitude position of the sphere corresponding to the position (x2, y2) in the region 2 in the omnidirectional image; and a line mapped to the sphere by a first dimensional coordinate axis of the region 1 is the same as a line mapped to the sphere by a first dimensional coordinate axis of the region 2, and is an equator line of the sphere.

In this embodiment, a front face and a right face in FIG. 10 are taken as the adjacent regions in the omnidirectional image, the front face is the region 1, and the right face is the region 2. The relationship between (x1, y1) and (φ1, θ1) is:

$$x1 = \frac{4}{\pi} \times \varphi1, \text{ and}$$

$$y1 = \frac{\theta1}{\tan^{-1}\cos\varphi1}.$$

The relationship between (x2, y2) and (φ2, θ2) is:

$$x2 = \frac{4}{\pi} \times \varphi2, \text{ and}$$

$$y2 = \frac{\theta2}{\tan^{-1}\cos\varphi2}.$$

Figure 11:
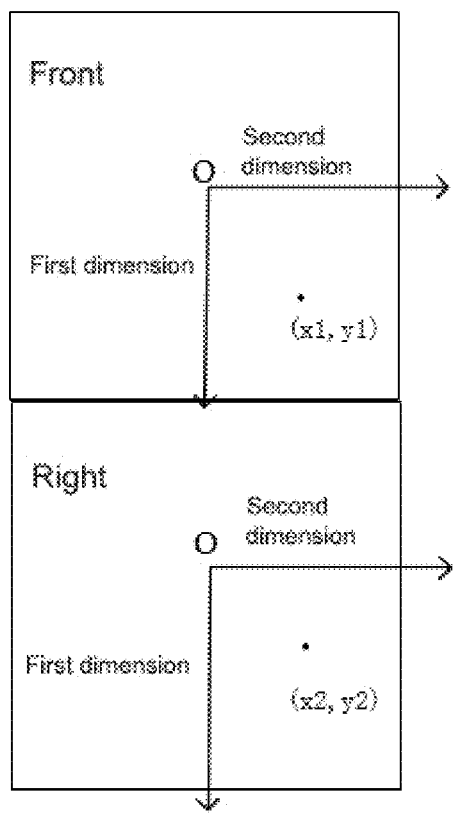
FIG. 11 is a schematic diagram of two adjacent regions arranged vertically in an embodiment of the present invention.

In this embodiment, first dimensional directions of the region 1 and the region 2 are both vertical directions, as shown in FIG. 11.

Embodiment 8

The embodiment of the present invention provides an omnidirectional image format conversion method.

The omnidirectional image format conversion method provided by the present embodiment includes the following steps:

At least one image region is included in a to-be-generated omnidirectional image. A mapping relationship between a position (x, y) in the image region and a position (θ, φ) on a sphere is:

x and φ are in linear relationship, and y and $$\frac{\theta}{\tan^{-1}\cos\varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, a first dimensional direction is a horizontal direction, as shown in FIG. 4.

A position on the sphere is mapped to a source format. An Equirectangular Projection (ERP) is taken as the source format, and a mapping relationship between the position (u, v) in the ERP and the position (θ, φ) on the sphere is:

φ=(u−0.5)*(2*π), and

θ=(0.5−v)*π.

The values of u and v are both in [0,1].

Interpolation is performed on the ERP to generate pixel values in the to-be-generated omnidirectional image.

Figure 12:
FIG. 12 is a source ERP image for generating an unfolded image of a cube in an embodiment of the present invention.
Figure 13:
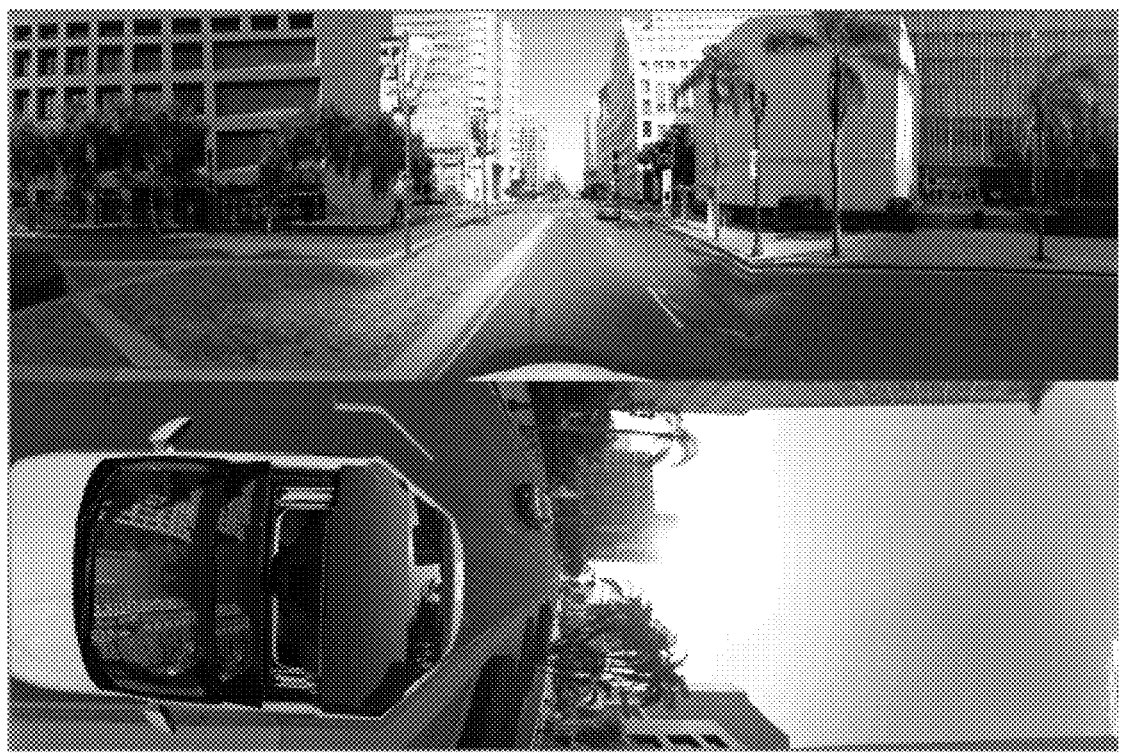
FIG. 13 is an unfolded image of a cube generated through format conversion from a source ERP image by using a processing method of this patent in an embodiment of the present invention.

FIG. 12 shows a source format image of the ERP, and FIG. 13 show an omnidirectional image in an unfolded CMP format.

Embodiment 9

The embodiment of the present invention provides an omnidirectional image processing method.

The omnidirectional image processing method provided by the present embodiment includes the following steps:

A code stream is decoded to obtain omnidirectional image coding format information. A mapping relationship between a position (x, y) in at least one region in an omnidirectional image obtained by decoding the code stream and a position (θ, φ) on a sphere is determined according to the format information. The mapping relationship is:

x and φ are in linear relationship, and y and $$\frac{\theta}{\tan^{-1}\cos\varphi}$$

are in linear relationship.

x represents a first dimensional coordinate position of the region in the decoded omnidirectional image, y represents a second dimensional coordinate position of the region in the decoded omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

Figure 14:
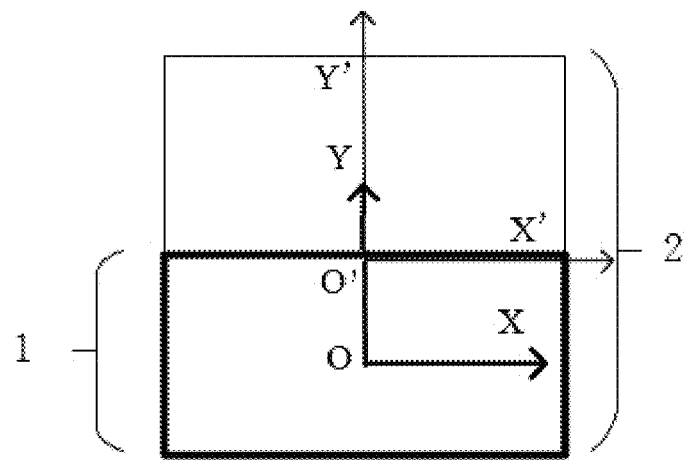
FIG. 14 is a schematic diagram of a stretching ratio of different mapping relations in an embodiment of the present invention.

In this embodiment, the region in the omnidirectional image is a rear face of the cube in FIG. 3. Coordinate systems shown in FIG. 14 are established on this face. In the X-Y coordinate system, when y=−1, $$\theta = -\frac{\pi}{4},$$

and when y=1, $$\theta = \frac{\pi}{2},$$

then the mapping relationship between (x, y) and (θ, φ) is:

$$x = \frac{4}{\pi} \times \varphi, \text{ and}$$

$$y = \frac{2\theta}{\tan^{-1}\cos\varphi} - 3.$$

In the X'-Y' coordinate system, when y'=−1, $$\theta = -\frac{\pi}{4},$$

and when y'=1, $$\theta = \frac{\pi}{4},$$

then the mapping relationship between (x', y') and (θ, φ) is:

$$x' = \frac{4}{\pi} \times \varphi, \text{ and}$$

$$y' = \frac{\theta}{\tan^{-1}\cos\varphi}.$$

The region where y=±1 is the effective content corresponding to the sphere in the omnidirectional image. Conversion between (x', y') and (x, y) is as follows:

x=x', and y=(y'−½)×2.

Through the above conversion, the mapping relationship between the position (x', y') in the omnidirectional image and the position (θ, φ) on the sphere can be derived as:

$$x' = \frac{4}{\pi} \times \varphi, \text{ and}$$

$$y' = \frac{\theta}{\tan^{-1}\cos\varphi} \times 2 + \frac{1}{2}.$$

Embodiment 10

The embodiment of the present invention provides an omnidirectional image processing device.

The omnidirectional image processing device provided by the present embodiment includes the following modules:

a format information extraction module, wherein input of the format information extraction module is a coding code stream, output of the format information extraction module is omnidirectional image format information, and the module decodes the coding code stream to obtain the omnidirectional image format information; and a position mapping module, wherein input of the position mapping module is the omnidirectional image format information, output of the position mapping module is a mapping relationship between a position (x, y) in at least one region in an omnidirectional image obtained by decoding the code stream and a position (θ, φ) on a sphere, and the mapping relationship is:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, the format information is a format number, and this format number specifies by default that a direction of a first dimensional coordinate of the region in the omnidirectional image is a horizontal direction, as shown in FIG. 4.

Figure 15:
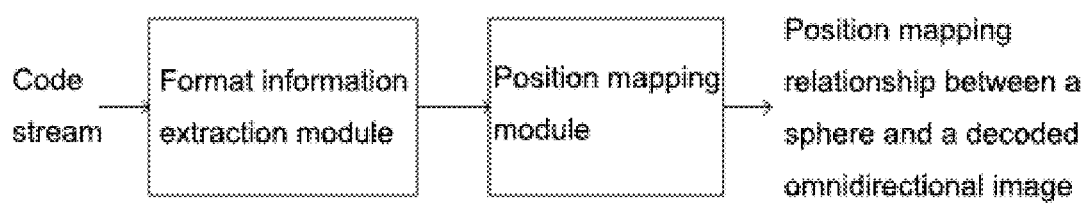
FIG. 15 is a processing device in an embodiment of the present invention.

FIG. 15 shows a schematic diagram of this processing device.

Embodiment 11

The embodiment of the present invention provides an omnidirectional image processing device.

The omnidirectional image processing device provided by the present embodiment includes the following modules:

a format information extraction module, wherein input of the format information extraction module is a coding code stream, output of the format information extraction module is omnidirectional image format information, and the module decodes the coding code stream to obtain the omnidirectional image format information; and a position mapping module, wherein input of the position mapping module is the omnidirectional image format information, output of the position mapping module is a mapping relationship between a position (x, y) in at least one region in an omnidirectional image obtained by decoding the code stream and a position (θ, φ) on a sphere, and the mapping relationship is:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, the format information includes a format number and direction information of a first dimensional coordinate of the region in the omnidirectional image, and this direction information specifies that a direction of the first dimensional coordinate of the region in the omnidirectional image is a vertical direction, as shown in FIG. 5.

FIG. 15 shows a schematic diagram of this processing device.

Embodiment 12

The embodiment of the present invention provides an omnidirectional image processing device.

The omnidirectional image processing device provided by the present embodiment includes the following modules:

a position mapping module, wherein output of the position mapping module is omnidirectional image format information, and a mapping relationship between a position (x, y) in at least one region in an omnidirectional image and a position (θ, φ) on a sphere is determined in the module as:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian; and a format information and image coding module, wherein input of the format information and image coding module is the omnidirectional image format information and the omnidirectional image expressed by the mapping relationship determined by the format information, output of the format information and image coding module is a code stream including the omnidirectional image and the format information of the omnidirectional image, and the module codes and writes the omnidirectional image and the format information to the code stream.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, the format information is a format number, and this format number specifies by default that a direction of a first dimensional coordinate of the region in the omnidirectional image is a horizontal direction, as shown in FIG. 4.

Figure 16:
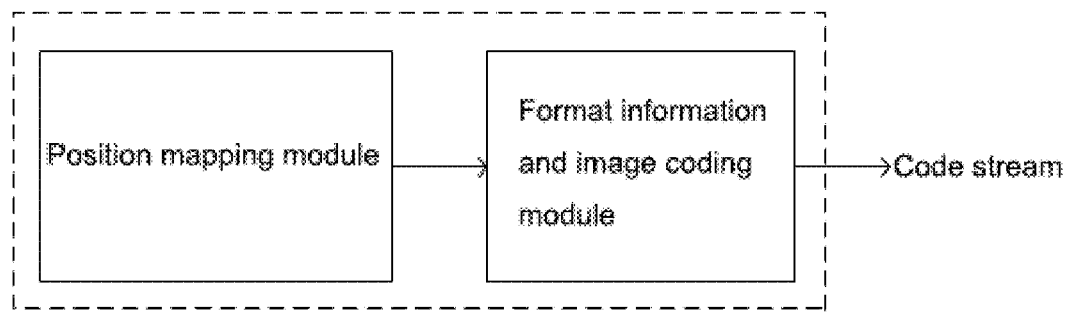
FIG. 16 is a processing device in an embodiment of the present invention.

FIG. 16 shows a schematic diagram of this processing device.

Embodiment 13

The embodiment of the present invention provides an omnidirectional image processing device.

The omnidirectional image processing device provided by the present embodiment includes the following modules:

a position mapping module, wherein output of the position mapping module is omnidirectional image format information, and a mapping relationship between a position (x, y) in at least one region in an omnidirectional image and a position (θ, φ) on a sphere is determined in the module as:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian; and a format information and image coding module, wherein input of the format information and image coding module is the omnidirectional image format information and the omnidirectional image expressed by the mapping relationship determined by the format information, output of the format information and image coding module is a code stream including the omnidirectional image and the format information of the omnidirectional image, and the module codes and writes the omnidirectional image and the format information to the code stream.

In the present embodiment, the omnidirectional image is in a CMP format, the region is a front face of the cube in FIG. 3, and the mapping relationship between (x, y) and (θ, φ) is:

$$x = \frac{4}{\pi} \times \varphi, \text{ and}$$

$$y = \frac{\theta}{\tan^{-1}\cos\varphi}.$$

In this embodiment, the format information includes a format number and direction information of a first dimensional coordinate of the region, and this direction information specifies that a direction of the first dimensional coordinate of the region in the omnidirectional image is a vertical direction, as shown in FIG. 5.

FIG. 16 shows a schematic diagram of this processing device.

Embodiment 14

The embodiment of the present invention provides an omnidirectional image generation method.

The omnidirectional image generation method provided by the present embodiment includes the following steps:

At least one image region is included in a to-be-generated omnidirectional image. A mapping relationship between a position (x, y) in the image region and a position (θ, φ) on a sphere is specified as:

x and φ are in linear relationship, and y and $$\frac{\theta}{\tan^{-1}\cos\varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

Figure 17:
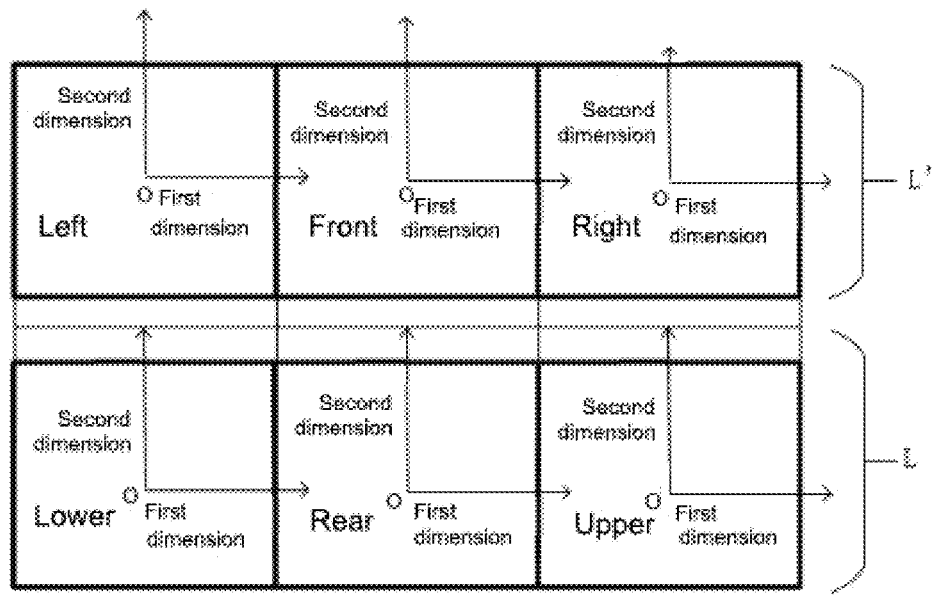
FIG. 17 is a schematic diagram of arrangement of each face and an effective region of a CMP format in an embodiment of the present invention.

In the present embodiment, the to-be-generated omnidirectional image is in a CMP format. As shown in FIG. 17, coordinate systems are respectively established on six faces of the cube. For the faces on the first line of the CMP format, namely, the left, front and right faces, a first dimensional direction is a horizontal direction. When y=−0.8 and x=0

$$\theta = -\frac{\pi}{4},$$

and when y=1 and x=0, $$\theta = \frac{\pi}{4},$$

then the mapping relationship between (x, y) and (θ, φ) is:

$$x = \frac{4}{\pi} \times \varphi, \text{ and}$$

$$y = \frac{0.9\theta}{\tan^{-1}\cos\varphi} + 0.1.$$

In FIG. 17, the region enclosed by thick lines represents an effective region in the face of the cube, the height of this region is L', and the side length of the face of the cube is L. In the front face, the region outside the thick lines is a non-effective region, the pixels in this region are filled with the pixels in the line where y=−0.8, and the pixels in non-effective regions of the left and right faces are also filled with the pixels in the lines where y=−0.8 in the corresponding regions.

For the faces on the second line of the CMP format, namely, the upper, lower and rear faces, a first dimensional direction is the horizontal direction. When y=0.8 and x=0, $$\theta = \frac{\pi}{4},$$

and when y=−1 and x=0, $$\theta = -\frac{\pi}{4},$$

then the mapping relationship between (x, y) and (θ, φ) is:

$$x = \frac{4}{\pi} \times \varphi, \text{ and}$$

$$y = \frac{0.9\theta}{\tan^{-1}\cos\varphi} - 0.1.$$

In the rear face, the region outside the thick lines is a non-effective region, the pixels in this region are filled with the pixels in the line where y=0.8, and the pixels in non-effective regions of the upper and lower faces are also filled with the pixels in the lines where y=0.8 in the corresponding regions.

Embodiment 15

The embodiment of the present invention provides an omnidirectional image generation method.

The omnidirectional image generation method provided by the present embodiment includes the following steps:

At least one image region is included in a to-be-generated omnidirectional image. A mapping relationship between a position (x, y) in the image region and a position (θ, φ) on a sphere is:

x and φ are in linear relationship, and y and $$\frac{\theta}{\tan^{-1}\cos\varphi}$$

are in linear relationship.

x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

Figure 18:
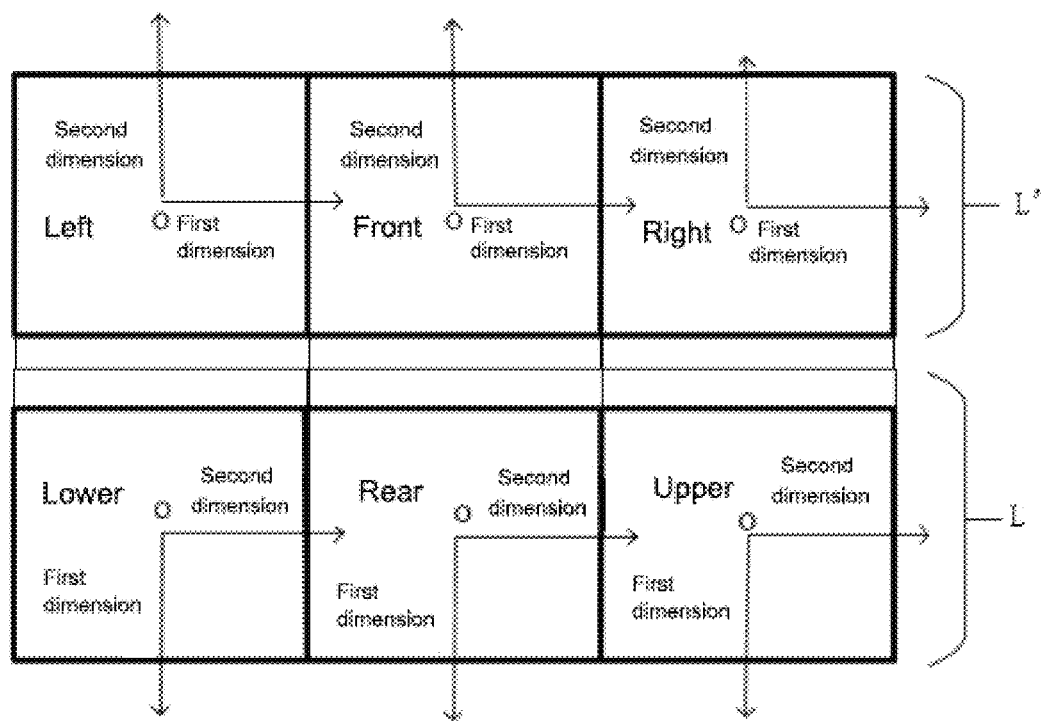
FIG. 18 is a schematic diagram of arrangement of each face and an effective region of a CMP format in an embodiment of the present invention.

In the present embodiment, the to-be-generated omnidirectional image is in a CMP format. As shown in FIG. 18, coordinate systems are respectively established on six faces of the cube. For the faces on the first line of the CMP format, namely, the left, front and right faces, a first dimensional direction is a horizontal direction. When y=−0.8 and x=0, $$\theta = -\frac{\pi}{4},$$

and when y=1 and x=0, $$\theta = \frac{\pi}{4},$$

then the mapping relationship between (x, y) and (θ, φ) is:

$$x = \frac{4}{\pi} \times \varphi, \text{ and}$$

$$y = \frac{0.9\theta}{\tan^{-1}\cos\varphi} + 0.1.$$

In FIG. 18, the region enclosed by thick lines represents an effective region in the face of the cube, the height of this region is L', and the side length of the face of the cube is L. In the front face, the region outside the thick lines is a non-effective region, the pixels in this region are generated by interpolation on the sphere according to the same mapping relationship as in the effective region, and at this time, the value of y is less than −0.8. The pixels in non-effective regions of the left and right faces are generated by interpolation on the sphere according to the same mapping relationship as in the corresponding effective regions.

For the faces on the second line of the CMP format, namely, the upper, lower and rear faces, a first dimensional direction is a vertical direction. When x=−0.8, $$\varphi = -\frac{\pi}{4},$$

and when x=1, $$\varphi = \frac{\pi}{4},$$

then the mapping relationship between (x, y) and (θ, φ) is:

$$x = \frac{3.6}{\pi} \times \varphi + 0.1, \text{ and}$$

$$y = \frac{\theta}{\tan^{-1}\cos\varphi}.$$

In the rear face, the region outside the thick lines is a non-effective region, the pixels in this region are generated by interpolation on the sphere according to the same mapping relationship as in the effective region, and at this time, the value of x is less than −0.8. The pixels in non-effective regions of the upper and lower faces are also generated by interpolation on the sphere according to the same mapping relationship as in the corresponding effective regions.

Finally, it should be noted that the above embodiments are merely to illustrate the technical solutions of the present invention, and not to limit them. Although the present invention has been illustrated in detail with reference to the foregoing embodiments, those of ordinary skill in the art should understand that they can still make modifications on the technical solutions recorded in various embodiments, or equivalent replacements on some of the technical features. However, these modifications or replacements do not make the nature of the corresponding technical solutions depart from the scope of the technical solutions of various embodiments in the present invention.

The invention claimed is:

1. An omnidirectional image processing method, comprising:
   decoding a code stream to obtain omnidirectional image coding format information; and
   determining a mapping relationship between a position (x, y) in at least one region in an omnidirectional image obtained by decoding the code stream and a position (θ, φ) on a sphere according to the format information, wherein the mapping relationship is:
   x and φ are in linear relationship, and y and
   $$\frac{\theta}{\tan^{-1}\cos\varphi}$$
   are in linear relationship,
   where x represents a first dimensional coordinate position of the region in the decoded omnidirectional image, y represents a second dimensional coordinate position of the region in the decoded omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

2. The omnidirectional image processing method according to claim 1, wherein the format information is one of the following:
   1) the format information is a format number, and the format number specifies a direction of a first dimensional coordinate of the region in the decoded omnidirectional image by default; and
   2) the format information comprises a format number and direction information of the first dimensional coordinate of the region in the decoded omnidirectional image.

3. An omnidirectional image processing method, comprising the following steps:
   expressing at least one image region in an omnidirectional image by the following mapping relationship, wherein the mapping relationship between a position (x, y) in the image region and a position (θ, φ) on a sphere is:
   x and φ are in linear relationship, and y and
   $$\frac{\theta}{\tan^{-1}\cos\varphi}$$
   are in linear relationship,
   where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian;
   coding and writing the omnidirectional image expressed by the mapping relationship to a code stream; and
   writing format information of the mapping relationship to the code stream.

4. The omnidirectional image processing method according to claim 3, wherein the format information is one of the following:
   1) the format information is a format number, and the format number specifies a direction of a first dimensional coordinate of the region in the omnidirectional image by default; and
   2) the format information comprises a format number and direction information of the first dimensional coordinate of the region in the omnidirectional image.

5. An omnidirectional image processing method, comprising:
   decoding a code stream to obtain omnidirectional image coding format information; and
   determining mapping relationships between a position (x1, y1) in a region 1 and a position (x2, y2) in a region 2 and their respective corresponding positions (θ1, φ1) and (θ2, φ2) on a sphere according to the format information since at least one pair of adjacent regions, i.e. the region 1 and the region 2, is present in a decoded omnidirectional image, wherein the mapping relationships are:
   x1 and φ1 are in linear relationship, and y1 and
   $$\frac{\theta 1}{\tan^{-1}\cos\varphi 1}$$
   are in linear relationship;
   x2 and φ2 are in linear relationship, and y2 and
   $$\frac{\theta 2}{\tan^{-1}\cos\varphi 2}$$
   are in linear relationship,
   where x1 represents a first dimensional coordinate position of the region 1 in the omnidirectional image, y1 represents a second dimensional coordinate position of the image region 1, φ1 represents a longitude position of the sphere corresponding to the position (x1, y1) in the region 1 in the omnidirectional image, and θ1 represents a latitude position of the sphere corresponding to the position (x1, y1) in the region 1 in the omnidirectional image; x2 represents a first dimensional coordinate position of the region 2 in the omnidirectional image, y2 represents a second dimensional coordinate position of the region 2 in the omnidirectional image, φ2 represents a longitude position of the sphere corresponding to the position (x2, y2) in the image region 2, and θ2 represents a latitude position of the sphere corresponding to the position (x2, y2) in the region 2 in the omnidirectional image; and a line mapped to the sphere by a first dimensional coordinate axis of the region 1 is the same as a line mapped to the sphere by a first dimensional coordinate axis of the region 2, and is an equator line of the sphere.

6. An omnidirectional image processing device, comprising the following modules:
   a format information extraction module, wherein input of the format information extraction module is a coding code stream, output of the format information extraction module is omnidirectional image format information, and the module decodes the coding code stream to obtain the omnidirectional image format information; and a position mapping module, wherein input of the position mapping module is the omnidirectional image format information, output of the position mapping module is a mapping relationship between a position (x, y) in at least one region in an omnidirectional image obtained by decoding the code stream and a position (θ, φ) on a sphere, and the mapping relationship is:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian.

7. The omnidirectional image processing device according to claim 6, wherein the format information is one of the following:
1) the format information is a format number, and the format number specifies a direction of a first dimensional coordinate of the region in the omnidirectional image by default; and
2) the format information comprises a format number and direction information of the first dimensional coordinate of the region in the omnidirectional image.

8. An omnidirectional image processing device, comprising the following modules:
a position mapping module, wherein output of the position mapping module is omnidirectional image format information, and a mapping relationship between a position (x, y) in at least one region in an omnidirectional image and a position (θ, φ) on a sphere is determined in the module as:

x and φ are in linear relationship, and y and $$\frac{\theta}{\tan^{-1}\cos\varphi}$$

are in linear relationship, where x represents a first dimensional coordinate position of the region in the omnidirectional image, y represents a second dimensional coordinate position of the region in the omnidirectional image, φ represents a longitude position of the sphere, θ represents a latitude position of the sphere, a line mapped to the sphere by a first dimensional coordinate axis is an equator line, and a line mapped to the sphere by a second dimensional coordinate axis is a prime meridian; and a format information and image coding module, wherein input of the format information and image coding module is the omnidirectional image format information and the omnidirectional image expressed by the mapping relationship determined by the format information, output of the format information and image coding module is a code stream comprising the omnidirectional image and the format information of the omnidirectional image, and the module codes and writes the omnidirectional image and the format information to the code stream.

9. The omnidirectional image processing device according to claim 8, wherein the format information is one of the following:
1) the format information is a format number, and the format number specifies a direction of a first dimensional coordinate of the region in the omnidirectional image by default; and
2) the format information comprises a format number and direction information of the first dimensional coordinate of the region in the omnidirectional image.

* * * * *